(12) United States Patent
Otsuka et al.

(10) Patent No.: US 8,010,354 B2
(45) Date of Patent: Aug. 30, 2011

(54) NOISE CANCELLATION SYSTEM, SPEECH RECOGNITION SYSTEM, AND CAR NAVIGATION SYSTEM

(75) Inventors: Manabu Otsuka, Nishikamo-gun (JP); Ichiro Akahori, Anjou (JP)

(73) Assignee: Denso Corporation, Kariya (JP)

( * ) Notice: Subject to any disclaimer, the term of this patent is extended or adjusted under 35 U.S.C. 154(b) by 1862 days.

(21) Appl. No.: 11/023,553

(22) Filed: Dec. 29, 2004

(65) Prior Publication Data
US 2005/0159945 A1  Jul. 21, 2005

(30) Foreign Application Priority Data
Jan. 7, 2004  (JP) .................................. 2004-002387

(51) Int. Cl.
*G10L 15/20* (2006.01)
(52) U.S. Cl. ........................................ 704/233; 704/226
(58) Field of Classification Search .................. 704/233, 704/226
See application file for complete search history.

(56) References Cited

U.S. PATENT DOCUMENTS

| | | | |
|---|---|---|---|
| 4,574,389 A | | 3/1986 | Schotz |
| 5,828,756 A | | 10/1998 | Benesty et al. |
| 5,983,186 A | * | 11/1999 | Miyazawa et al. ............ 704/275 |
| 6,020,782 A | * | 2/2000 | Albert et al. ................... 327/552 |
| 6,665,645 B1 | | 12/2003 | Ibaraki et al. |
| 6,691,091 B1 | * | 2/2004 | Cerisara et al. ............... 704/255 |
| 7,165,028 B2 | * | 1/2007 | Gong ............................ 704/233 |
| 7,440,891 B1 | * | 10/2008 | Shozakai et al. ............. 704/233 |
| 2002/0152255 A1 | * | 10/2002 | Smith et al. ................... 709/102 |
| 2003/0040910 A1 | * | 2/2003 | Bruwer ......................... 704/266 |
| 2003/0236672 A1 | * | 12/2003 | Aaron et al. .................. 704/277 |
| 2005/0089177 A1 | * | 4/2005 | Hughes et al. ................. 381/86 |
| 2006/0126866 A1 | * | 6/2006 | Falcon .......................... 381/104 |
| 2008/0021706 A1 | * | 1/2008 | Bruwer ......................... 704/233 |

FOREIGN PATENT DOCUMENTS

| | | |
|---|---|---|
| JP | A-2001-100784 | 4/2001 |
| JP | A-2001-100785 | 4/2001 |
| JP | B2-3405512 | 3/2003 |
| WO | WO 99/53674 A | 10/1999 |
| WO | WO 00/68936 A | 11/2000 |

OTHER PUBLICATIONS

Campolucci et al., Intrinsic Stability-Control Method for Recursive Filters and Neural Networks, Aug. 2000, IEEE Trans., vol. 47, No. 8, 797-802.*

Preliminary Search Report from French Patent Office issued on Apr. 21, 2006 for the corresponding French patent application No. FR 0500119.

(Continued)

*Primary Examiner* — Jakieda R Jackson
(74) *Attorney, Agent, or Firm* — Posz Law Group, PLC (57) ABSTRACT

A noise cancellation system with improved performance for canceling from an input signal of a microphone a noise component relating to reproduced sound of an audio system reproducing multiple channels of sound, provided with an audio canceller for acquiring audio signals of two channels and processing them by filter coefficients by convolutional processing so as to produce noise cancellation signals at adaptive filters, an adder for adding the input signal of the microphone and the noise cancellation signals, canceling the noise component from the input signal, and outputting the signal after noise cancellation, nonlinear converters for nonlinear conversion of the signal after noise cancellation, and filter learning units for calculating the filter coefficients to be set next based on the nonlinear converted signal.

8 Claims, 8 Drawing Sheets

OTHER PUBLICATIONS

Office Action dated Jun. 5, 2009 in corresponding Chinese patent application No. 2006101693648 (and English translation).

Second Office Action dated Nov. 13, 2009 in corresponding Chinese patent application No. 200610169364.8 (with English translation).

Patent Publication granted dated May 26, 2010 in corresponding Chinese patent No. CN 1637857.

"Five Car AV & Navigation '99 Summer Models Released," from a website http://www.fujitsu-ten.co.jp/release/1999/0518.html, May 18, 1999.

Bell and Sejnowski, "An information-maximisation approach to blind separation and blind deconvolution," Neural Computation, 7, 6, 1004-1034, Nov. 1995.

Mathis and Douglas, "On Optimal and Universal Nonlinearities for Blind Signal Separation," May 7, 2001.

Office Action dated Dec. 26, 2008 in corresponding Chinese patent application No. 2005100038387 (and English translation).

Office Action mailed Sep. 30, 2010 in corresponding CN application No. 200610169364.8 (English translation enclosed).

* cited by examiner

NOISE CANCELLATION SYSTEM, SPEECH RECOGNITION SYSTEM, AND CAR NAVIGATION SYSTEM

BACKGROUND OF THE INVENTION

1. Field of the Invention

The present invention relates to a noise cancellation system for canceling a noise component for sound reproduced by an audio system from a speech signal input from a microphone, a speech recognition system housing the same, and a car navigation system provided with such a speech recognition system.

2. Description of the Related Art

In the past, a speech recognition system has been known which captures the speech of a user by a microphone, compares it with patterns of speech stored in advance as recognition words, and recognizes high match recognition words as words spoken by the user. This type of speech recognition system is for example built into a car navigation system.

The speech recognition rate of a speech recognition system is known to be governed by the amount of the noise component included in the speech signal input from the microphone. When operating a vehicle-mounted audio system in the passenger compartment of an automobile etc., the music being reproduced by a speaker of the audio system ends up being picked up by the microphone together with the speech of the user as noise. Therefore, in the past, the practice had been to mute the audio system at the time of speech recognition so as to prevent the music etc. from being input to the microphone. (For example, see "Public News Release, 'Five Car AV & Navigation '99 Summer Models Released', [online], May 18, 1999, Fujitsu-Ten, [Oct. 16, 2003 search], Internet <URL: HYPERLINK "http://www.fujitsu-ten.co.jp/release/1999/0518.html", http://www.fujitsu-ten.co.jp/release/1999/0518.html>).

However, in a conventional system of this configuration, since the reproduction of the music etc. ends up being temporarily interrupted at the time of speech recognition, the possibility of the user becoming displeased becomes high. Therefore, in recent years, it has been considered to provide in the speech recognition system a noise cancellation system which acquires the audio signal input to the speaker, estimates the noise component included in the speech signal obtained from the microphone based on this, and cancels the noise component from the speech signal.

As the noise cancellation system, one using a least mean square (LMS) algorithm for the method of estimation of the noise component is known. This type of noise cancellation system acquires the audio signal input to a speaker of the audio system, filters the audio signal by an adaptive filter so as to produce a noise cancellation signal for canceling the noise component from the speech signal, and cancels the noise component included in the speech signal acquired from the microphone based on this noise cancellation signal.

Further, this noise cancellation system is provided with a filter learning unit for changing the characteristic of the adaptive filter (filter coefficient) using the normalized-LMS method (NLMS method, also known as the learning identification method) based on the noise-less speech signal. Due to repeated operation of the filter learning unit, the noise component included in the speech signal is suitably canceled by the noise cancellation signal.

As vehicle-mounted audio systems, audio systems having stereo playback functions (hereinafter also referred to as "stereo audio systems") have become very widespread, so in vehicle-mounted noise cancellation systems, it is preferable that the noise component produced due to the music etc. being picked up by the microphone can be suitably canceled out. However, with just changing the design of the noise cancellation system to one for a stereo audio system, there was the problem that the entire noise component of the plurality of channels could not be suitably canceled from the speech signal.

As an example of the configuration of a noise cancellation system for a stereo audio system, for example, one providing an adaptive filter and filter learning unit for each channel may be considered (for example, see Japanese Unexamined Patent Publication (Kokai) No. 2001-100784, FIG. 25). In this configuration, filter learning units corresponding to the channels update the filter coefficients based on the noise-less speech signal with residual noise components of other channels, so the learning processes interfere with each other and the filter learning units of the channels mistakenly learn the filter coefficients from the speech signal. Therefore, a noise cancellation system of this configuration cannot cancel the entire noise component of a plurality of channels from a speech signal.

In view of this problem, the speech recognition system of Japanese Unexamined Patent Publication (Kokai) No. 2001-100785 is designed to acquire the audio signals of the channels input to the speakers of an audio system, convert them to a monaural signal, estimate the noise component based on this monaural signal, and cancel the noise component from the speech signal.

Further, Japanese Unexamined Patent Publication (Kokai) No. 10-190848 describes a noise echo canceller method which nonlinearly converts the audio signals of different channels input to speakers of the audio system so as to reduce the correspondence between channels for reproduced sound of an audio system picked up by a microphone and thereby prevent mistaken learning of filter coefficients in the filter learning units corresponding to the channels.

Summarizing the problems to be solved by the invention, the speech recognition system described in Japanese Unexamined Patent Publication (Kokai) No. 2001-100785 estimated the noise component relating to stereo reproduced music etc. based on a monaural signal of the audio signals obtained from the audio system, so had the problem that the estimation error was large and the noise component could not be canceled from the input signal of the microphone with a sufficient precision.

Further, the audio echo canceller method described in Japanese Unexamined Patent Publication (Kokai) No. 10-190848 nonlinearly converted the audio signals of the different channels and used the converted audio signals to produce noise from the speakers, so had the problem that the sound deteriorated in quality. Therefore, if applying this audio echo canceller method to the noise cancellation system for an audio system designed mainly for playing back music etc., the music etc. deteriorated in quality and the user became displeased in many cases.

SUMMARY OF THE INVENTION

An object of the present invention is to provide a noise cancellation system for acquiring audio signals of different channels from an audio system reproducing multiple channels of sound and canceling the noise component relating to the reproduced sound of the audio system from the speech signal input from a microphone based on the audio signals of the different channels and improved in performance for canceling noise.

Another object of the present invention is to provide an easy-to-use speech recognition system and car navigation system using such a noise cancellation system superior in noise cancellation ability.

According to a first aspect of the invention, there is provided a noise cancellation system for acquiring audio signals of different channels from an audio system reproducing multiple channels of sound and canceling a noise component relating to reproduced sound of the audio system from a speech signal input from a microphone, provided with a noise-less speech signal output unit, a conversion unit, and a noise cancellation signal generation unit for each channel.

Each noise cancellation signal generation unit is provided with a filter element for filtering the audio signal of its own channel acquired from the audio system, filters it in accordance with a preset filter coefficient, and cancels the noise component from the speech signal.

The noise-less speech signal output unit uses each noise cancellation signal generated by the noise cancellation signal generation unit of the different channels to cancel the noise component included in a speech signal input from the microphone and output a noise-less speech signal.

The conversion unit is designed to nonlinearly convert the speech signal which the noise-less speech signal output unit outputs. Each noise cancellation signal generation unit is provided with a coefficient updating element for updating the filter coefficient set in the filter element based on the audio signal of its own channel acquired from the audio system and the speech signal nonlinearly converted by the conversion unit.

Since the thus configured noise cancellation system of the first aspect of the invention nonlinearly converts the noise-less speech signal output from the noise-less speech signal output unit and uses the nonlinearly converted speech signal to update the filter coefficient of the filter element provided for each channel by the filter updating element corresponding to each channel, the filter updating elements will not easily interfere with each other and mistaken learning of the filter coefficients will not easily occur at the coefficient updating elements.

That is, the filter coefficient learning operation in the coefficient updating element of each channel has been highly susceptible to the noise components of channels other than its own, but according to the noise cancellation system of the present invention, since a nonlinearly converted speech signal is used for learning the filter coefficients, this effect can be kept small. Therefore, it is possible to suppress mistaken learning of the filter coefficient at each coefficient updating element due to the noise components of other channels or the behavior of the coefficient updating elements of other channels.

Therefore, according to the first aspect, it is possible to more suitably cancel out the noise component of music etc. from a speech signal upon which a noise component of music etc. reproduced in multiple channels (stereo reproduction) by an audio system is superposed and therefore to improve the noise cancellation ability of the noise cancellation system.

Further, the conversion unit may use a tan h (hyperbolic tangent) function, sign function, or other nonlinear function for nonlinear conversion. Further, the noise cancellation system may be specifically configured as in a second aspect of the invention.

In the noise cancellation system of the second aspect of the present invention, the filter element processes a preset filter coefficient W[k] and an audio signal X(t) of its own channel by convolutional processing in accordance with the following equation (1):

$$C(t) = \sum_{k=1}^{K} W[k] \cdot X(t-k) \quad (1)$$

so as to filter the audio signal X(t) and generate the noise cancellation signal C(t).

Further, the conversion unit enters a speech signal U(t) which the noise-less speech signal output unit outputs into a nonlinear function f(x) as x=U(t) to generate a nonlinearly converted speech signal f(U(t)). In addition, the coefficient updating element calculates a filter coefficient F[k] based on the nonlinearly converted noise-less speech signal f(U(t)) generated by the conversion unit, the audio signal X(t) of its own channel, and the filter coefficient W[k] already set in the filter element in accordance with the following equations (2) and (3) including preset constants α and β:

$$F[k] = W[k] - \frac{\alpha \cdot f(U(t)) \cdot X(t-k)}{\text{norm} + \beta} \quad (2)$$

$$\text{norm} = \frac{1}{K} \cdot \sum_{k=1}^{K} |X(t-k)| \quad (3)$$

where, the constant K is a tap number of a whole number of 2 or more, and the variable t is a variable indicating time and a whole value and sets this filter coefficient F[k] in the filter element so as to update the filter coefficient W[k].

According to the noise cancellation system of the second aspect configured in this way, like in the first aspect, it is possible to more suitably cancel the noise component of music etc. reproduced by an audio system from the speech signal and thereby improve the noise cancellation ability of the noise cancellation system.

The conversion unit in the noise cancellation systems of the first and second aspects of the invention may be configured to use a tan h function of a nonlinear function for the nonlinear conversion. Alternatively, the conversion unit may use a sign function of a nonlinear function for the nonlinear conversion. Alternatively, the conversion unit may use a function g(x) of a nonlinear function for the nonlinear conversion:

$$g(x) = \begin{cases} 1 & (1/m \le x) \\ m \cdot x & (-1/m < x < 1/m) \\ -1 & (x \le -1/m) \end{cases} \quad (4)$$

where the variable m is a positive real number larger than 1.

Depending on the type of the nonlinear function, the noise cancellation performance of the system and the processing load on the conversion unit of the system will differ, but according to the noise cancellation system of the third aspect of the invention using a tan h function, it is possible to suppress the processing load on the conversion unit and sufficiently improve the noise cancellation performance.

Further, if using a sign function as in the noise cancellation system of the fourth aspect of the invention, while the noise cancellation performance drops compared with the noise cancellation system of the third aspect of the invention, it is possible to reduce the processing load on the conversion unit. In addition, if using the function g(x) as in the noise cancellation system of the fifth aspect of the invention, it is possible to reduce the processing load while obtaining a noise cancellation performance of the same extent as the noise cancellation system of the third aspect of the invention.

Further, the noise cancellation systems of the first and second aspects of the invention may also use nonlinear functions other than those explained above. The nonlinear functions may be selected based on the discovery of known independent component analysis (ICA). For independent component analysis, for example, see A. J. Bell, T. J. Sejnowski, "An information-maximization approach to blind separation and blind deconvolution", *Neural Computation*, 7(6), pp. 1129-1159, 1995, H. Mathis, S. Douglas, "On optimal and universal nonlinearities for blind signal separation", *Proc. of Intnl. Conf. on Acoustics, Speech and Signal Processing* (*ICASSP*), 2001, etc.

Above, noise cancellation systems according to the present invention were explained, but these may also be built into speech recognition systems. The speech recognition system according to the sixth aspect of the invention is provided with a noise cancellation system of the first aspect of the invention and a speech recognition unit for recognizing the speech of a user input to a microphone based on the noise-less speech signal obtained from the noise cancellation system.

The speech recognition system of the sixth aspect of the invention cancels the noise component included in the speech signal by a noise cancellation system having a high noise cancellation ability and uses the noise-less speech signal to recognize the speech of the user input to the microphone, so remarkably improves the speech recognition rate compared with the past.

In the systems of the related art, when an audio signal was superimposed on a speech signal as a noise component, the speech recognition rate dropped, so the practice had been to mute the audio system temporarily at the time of speech recognition, but according to the speech recognition system of the present invention, it is possible to accurately recognize speech without muting the audio system. Therefore, according to the sixth aspect of the invention, it is possible to eliminate displeasure of the user due to temporary interruption of reproduction of music etc. at the time of speech recognition.

If using the noise cancellation system of the present invention, it becomes possible to recognize speech while running music etc., but if recognizing speech while running music etc., several problems might arise. That is, in the related art, at the start of speech recognition, the practice had been to mute the audio system and not run music etc. or to emit a beep while running the music etc. to signal the start of speech recognition to the user, but if starting speech recognition while running music etc., even if emitting a beep, this may be masked by the music etc. causing the user to not notice it. That is, when starting speech recognition while running music etc., in the past, the user sometimes found it difficult to determine when speech recognition started.

Therefore, in a speech recognition system for recognizing speech while running music etc. (that is, while continuing to reproduce sound by the audio system), it is preferable to change the volume of the sound reproduced by the audio system at the time of speech recognition.

The speech recognition system of a seventh aspect of the invention is provided with a noise cancellation unit for acquiring audio signals of different channels from an audio system reproducing multiple channels of sound and canceling a noise component relating to reproduced sound of the audio system from a speech signal input from a microphone based on the audio signals of the channels, a speech recognition unit for recognizing speech of a user input to the microphone based on a noise-less speech signal obtained from the noise cancellation unit, and a control unit for making the speech signal recognition unit operate when a speech recognition start command is input from the outside. The control unit changes a volume of sound reproduced by the audio system to a predetermined value (except zero), then makes the speech recognition unit operate when the speech recognition start command is input at the time of operation of the audio system.

The thus configured speech recognition unit of the seventh aspect of the invention changes the volume of the music etc. reproduced by the audio system before and after speech recognition to inform the user of the start of the speech recognition, so the user can reliably learn of the start of speech recognition by the change in volume. Therefore, according to the seventh aspect, it is possible to eliminate the problem arising due to a beep being masked by music etc.

Further, at the time of adjustment of the volume, it is possible to utilize the Lombard effect to make the user speak loudly. The Lombard effect is the phenomenon of the volume of speech of a user rising in a large noise environment.

The speech recognition system according to an eighth aspect of the present invention is provided with a history preparing unit for preparing history information relating to a volume of speech of a user based on the noise-less speech signal obtained from the noise cancellation unit at the time of operation of the speech recognition unit and a volume determining unit for determining a volume to be set in the audio system at the time of next speech recognition based on the history information prepared by the history preparing unit. The control unit in the speech recognition system changes the volume of sound reproduced by the audio system to a volume determined by the volume determining unit and then makes the speech recognition unit operate when a speech recognition start command is input from the outside.

According to the speech recognition system of the eighth aspect of the invention, it is possible to change the volume based on the history information so that the Lombard effect is manifested, possible to increase the volume of speech of a user with a small voice, and possible to improve the speech recognition rate.

More specifically, to utilize the Lombard effect to improve the speech recognition rate, it is sufficient to configure the volume determining unit so as to evaluate a level of volume of speech of the user based on the history information and determine a reproduced volume of the audio system at the time of speech recognition to a volume larger than a predetermined reference value when that evaluated value is smaller than a predetermined evaluation standard. According to the thus configured speech recognition system of the ninth aspect of the invention, the speech recognition rate is improved.

Further, if building the speech recognition system of the present invention into a car navigation system, it becomes possible for a driver of a vehicle etc. to accurately control the car navigation system without using a remote controller. Therefore, according to the car navigation systems of the 10th and 11th aspects of the invention, the operability of the system is improved.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 1:
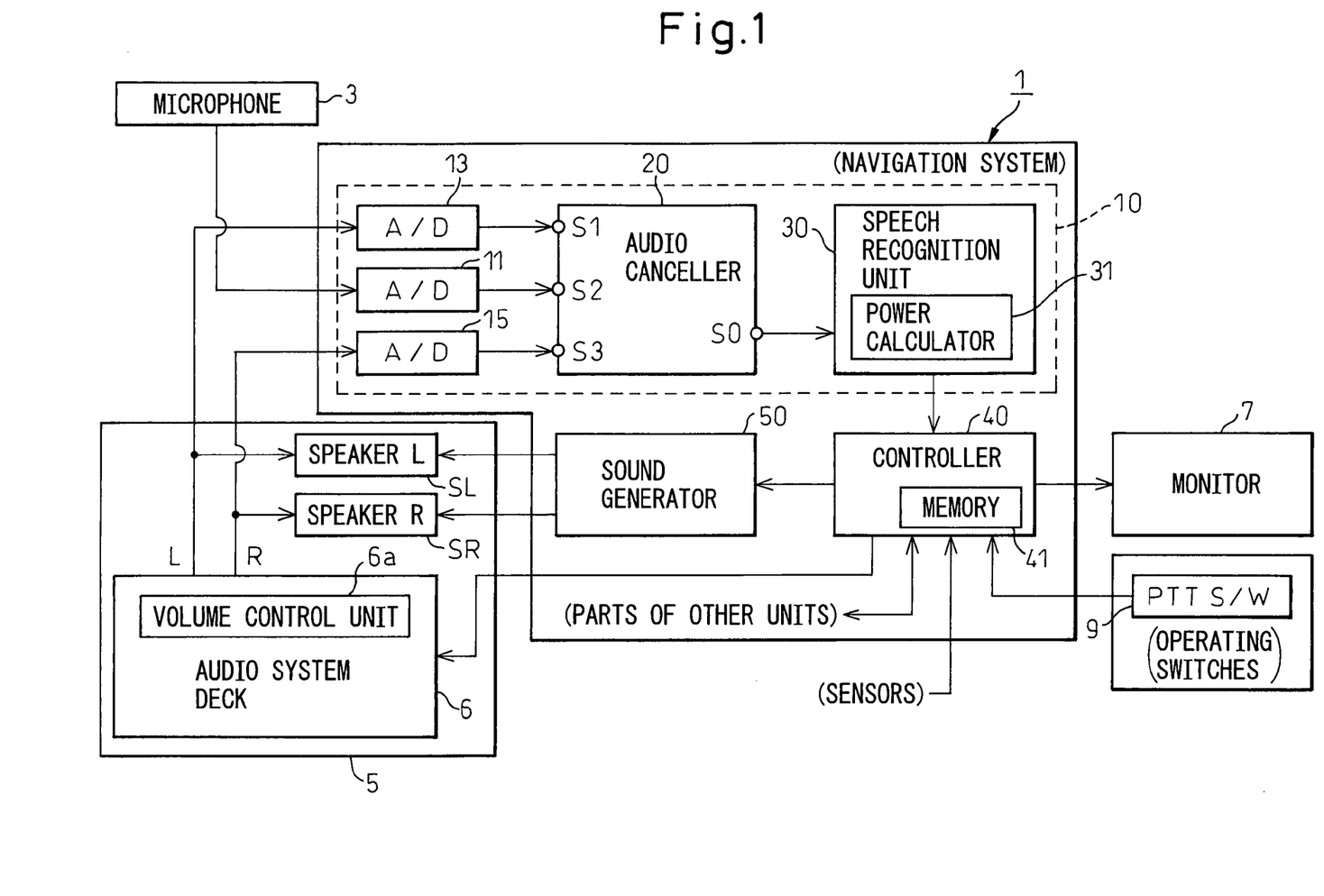
FIG. 1 is a block diagram of the general configuration of a car navigation system to which the present invention is applied.

FIG. 1 is a block diagram of the general configuration of the car navigation system 1 to which the present invention is applied. The car navigation system 1 of the present embodiment is provided with a speech recognition system 10 connected to a microphone 3 and car-mounted audio system 5, a controller 40 provided with a CPU, memory 41, etc. for controlling the display of the monitor 7 or controlling the other parts of the system, and a sound generator 50 connected to the speakers SR and SL of the audio system 5, generating a speech signal in accordance with command signals from the controller 40, and outputting it to the speakers SR and SL.

Figure 6A:
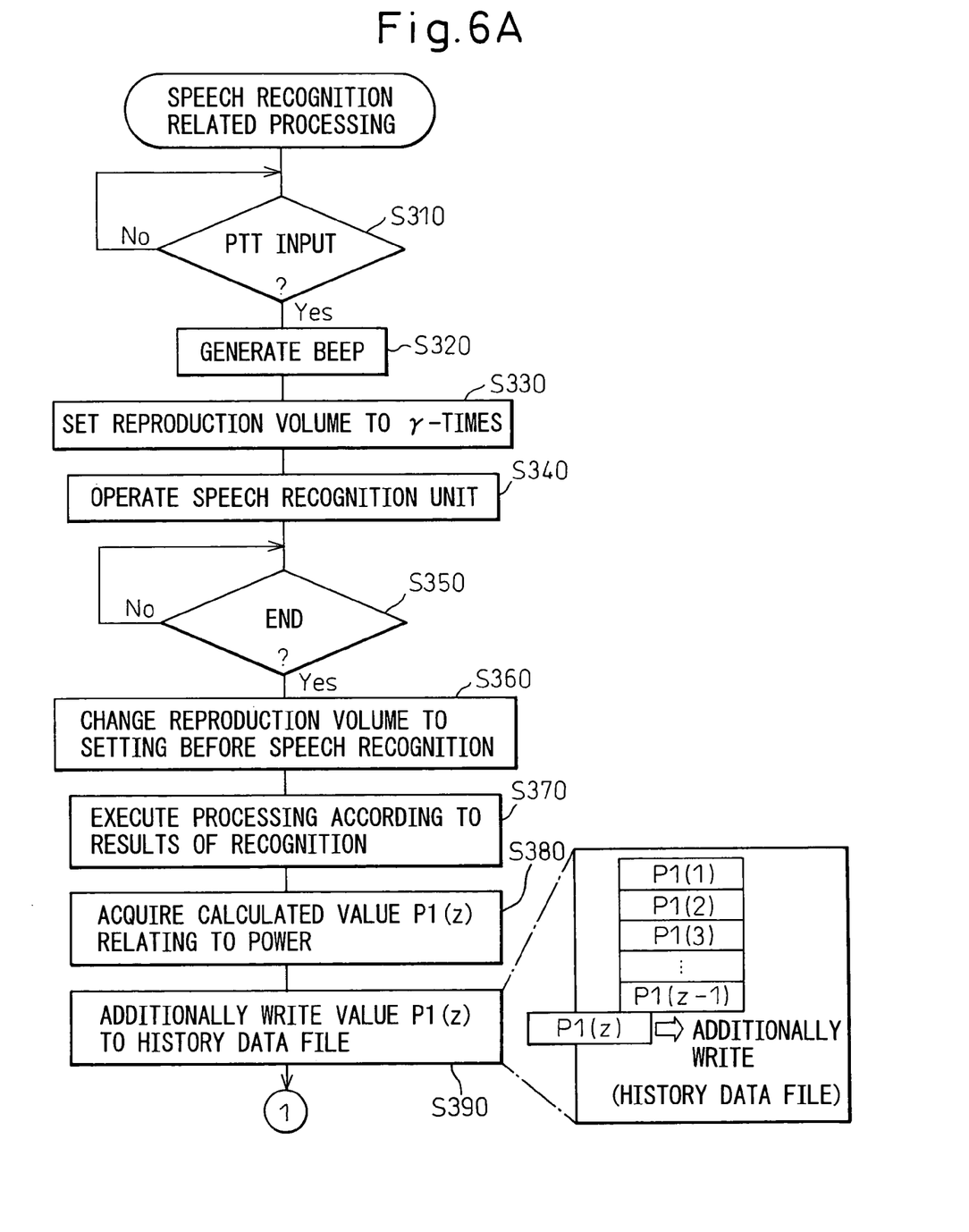
FIGS. 6A and 6B are flow charts of speech recognition related processing executed by a controller.
Figure 6B:
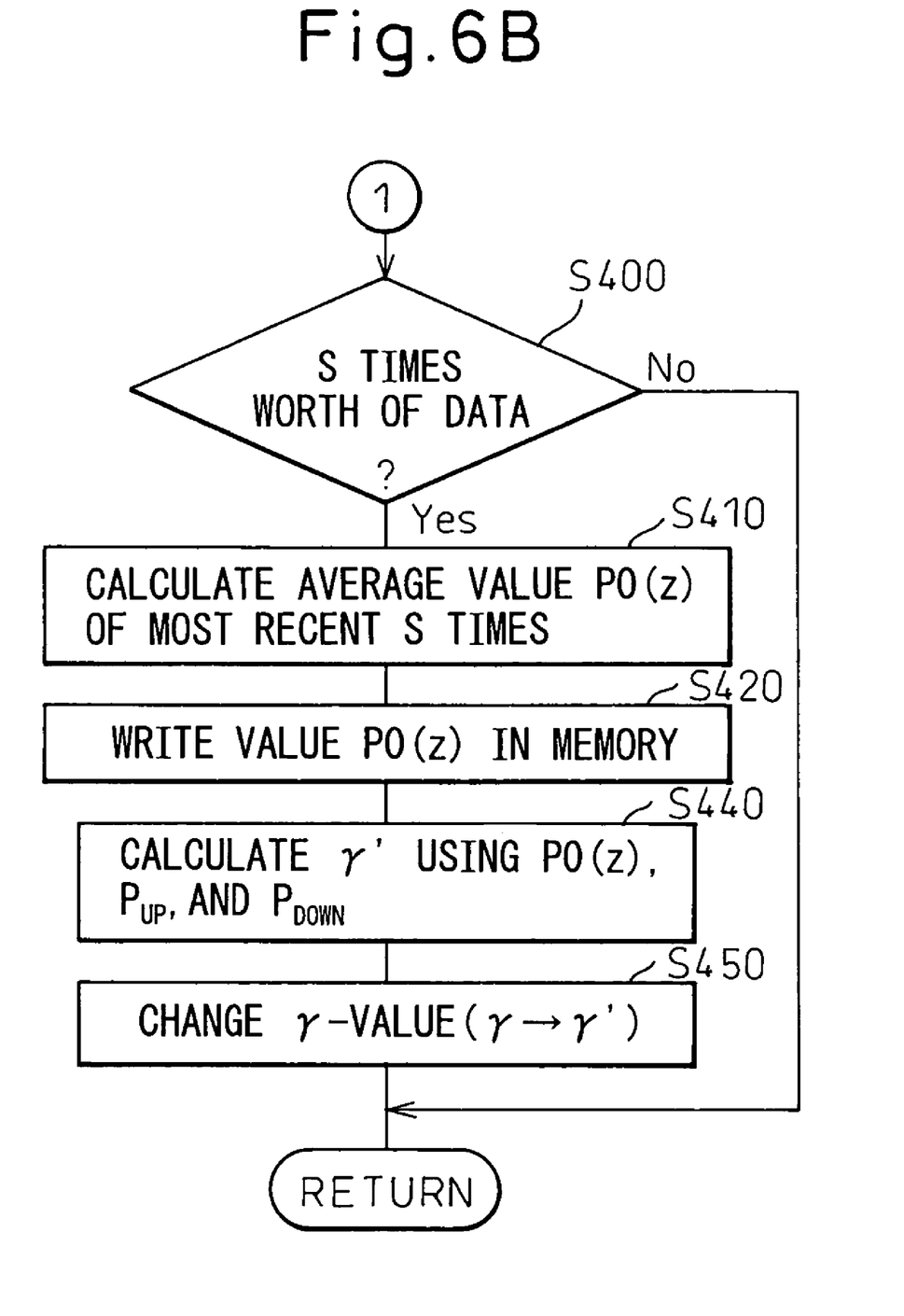

The car navigation system 1 executes various processing by the controller 40 in accordance with the command signals input from the operating switches (PTT (push to talk) switch 9 etc.) As the processing which the controller 40 of the car navigation system 1 executes, searching and guidance of the route to the destination, guidance to surrounding facilities, changes in region and scale of the road map displayed on the monitor 7, and other processing executed by known car navigation systems may be mentioned. In addition, the controller 40 of the car navigation system 1 executes the later explained speech recognition related processing (see FIG. 6).

The audio system 5 has a multichannel sound reproduction function (stereo playback function) and is provided with an audio system deck 6 and channel speakers SR and SL. The audio system deck 6 is provided with a volume controller 6a for controlling the volume of the sound output from the speakers SR and SL. It controls the volume controller 6a to control the volume of the sound output from the speakers SR and SL in accordance with command signals input from a control panel (not shown) of the audio system deck 6 and the controller 40 of the car navigation system 1. Further, the audio signals of the channels output from the audio system deck 6 are input to the speakers SR and SL corresponding to the channels and the speech recognition system 10.

The speech recognition system 10 is provided with an A/D converter 11 for converting a speech signal input from a microphone 3 from an analog to digital format, an A/D converter 13 for converting an L channel audio signal input from the audio system 5 from an analog to digital format, an A/D converter 15 for converting an R channel audio signal input from the audio system 5 from an analog to digital format, an audio canceller 20, and a speech recognition unit 30.

Figure 2:
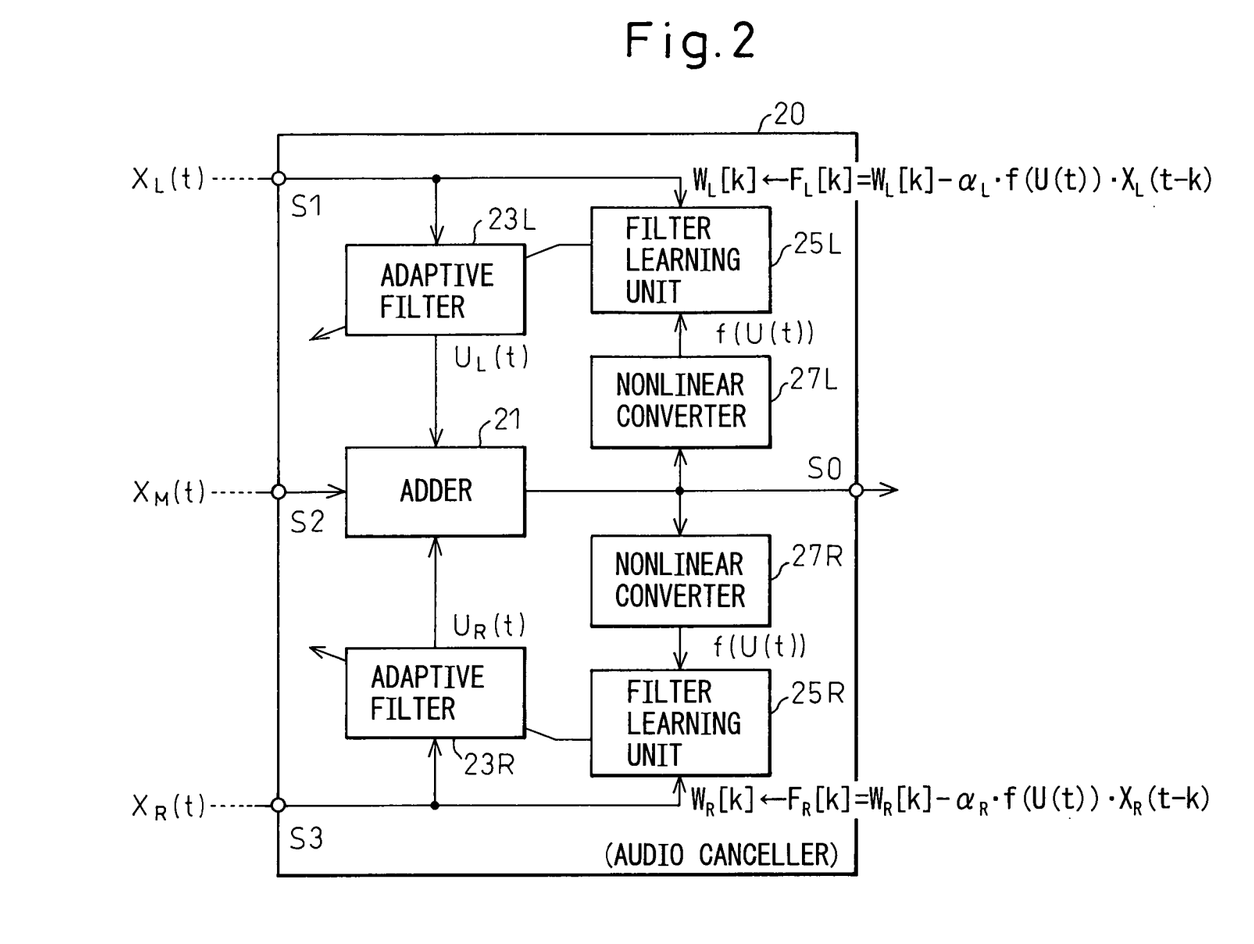
FIG. 2 is a block diagram of the functions of an audio canceller.

Further, the audio canceller 20, as shown in FIG. 2, is provided with an adder 21 and adaptive filters 23L and 23R, filter learning units 25L and 25R, and nonlinear converters 27L and 27R for each channel. FIG. 2 is a block diagram of the functions showing the general configuration of the audio canceller 20.

The adaptive filter 23L provided at the audio canceller 20 performs convolutional processing on the digitally converted L channel audio signal $X_L(t)$ input from the A/D converter 13 through the terminal S1 and the preset filter coefficient $W_L[k]$ in accordance with equation (5) so as to filter the audio signal $X_L(t)$ by the filter coefficient $W_L[k]$ and generate a noise cancellation signal $U_L(t)$ for canceling from the speech signal input from the microphone 3 the noise component relating to the sound output from the speaker SL. Further, the variable k used here takes a whole value satisfying $1 \leq k \leq K$. Further, the constant K expresses a tap number and takes a whole value of 2 or more. In addition, the variable t is a time variable having the sampling period T as a unit and takes a whole value.

$$U_L(t) = \sum_{k=1}^{K} W_L[k] \cdot X_L(t-k) \quad (5)$$

On the other hand, the adaptive filter 23R performs convolutional processing on the digitally converted R channel audio signal $X_R(t)$ input from the A/D converter 15 through the terminal S3 and the preset filter coefficient $W_R[k]$ in accordance with equation (6) so as to filter the audio signal $X_R(t)$ by the filter coefficient $W_R[k]$ and generate a noise cancellation signal $U_R(t)$ for canceling from the speech signal input from the microphone 3 the noise component relating to the sound output from the speaker SR.

$$U_R(t) = \sum_{k=1}^{K} W_R[k] \cdot X_R(t-k) \quad (6)$$

Further, the adder 21 adds the digitally converted speech signal $X_M(t)$ input from the A/D converter 11 through the terminal S2, the noise cancellation signal $U_L(t)$ output from the adaptive filter 23L, and the noise cancellation signal $U_R(t)$ output from the adaptive filter 23R to cancel the noise component relating to the sound output from the speakers SL and SR from the speech signal $X_M(t)$ and output the noise-less speech signal U(t).

$$U(t)=X_M(t)+U_L(t)+U_R(t) \quad (7)$$

Further, in this embodiment, the values able to be taken by the signals $X_M(t)$, $X_L(t)$, $X_R(t)$, $U_L(t)$, $U_R(t)$, and U(t) are real numbers of −1 to 1.

Figure 3:
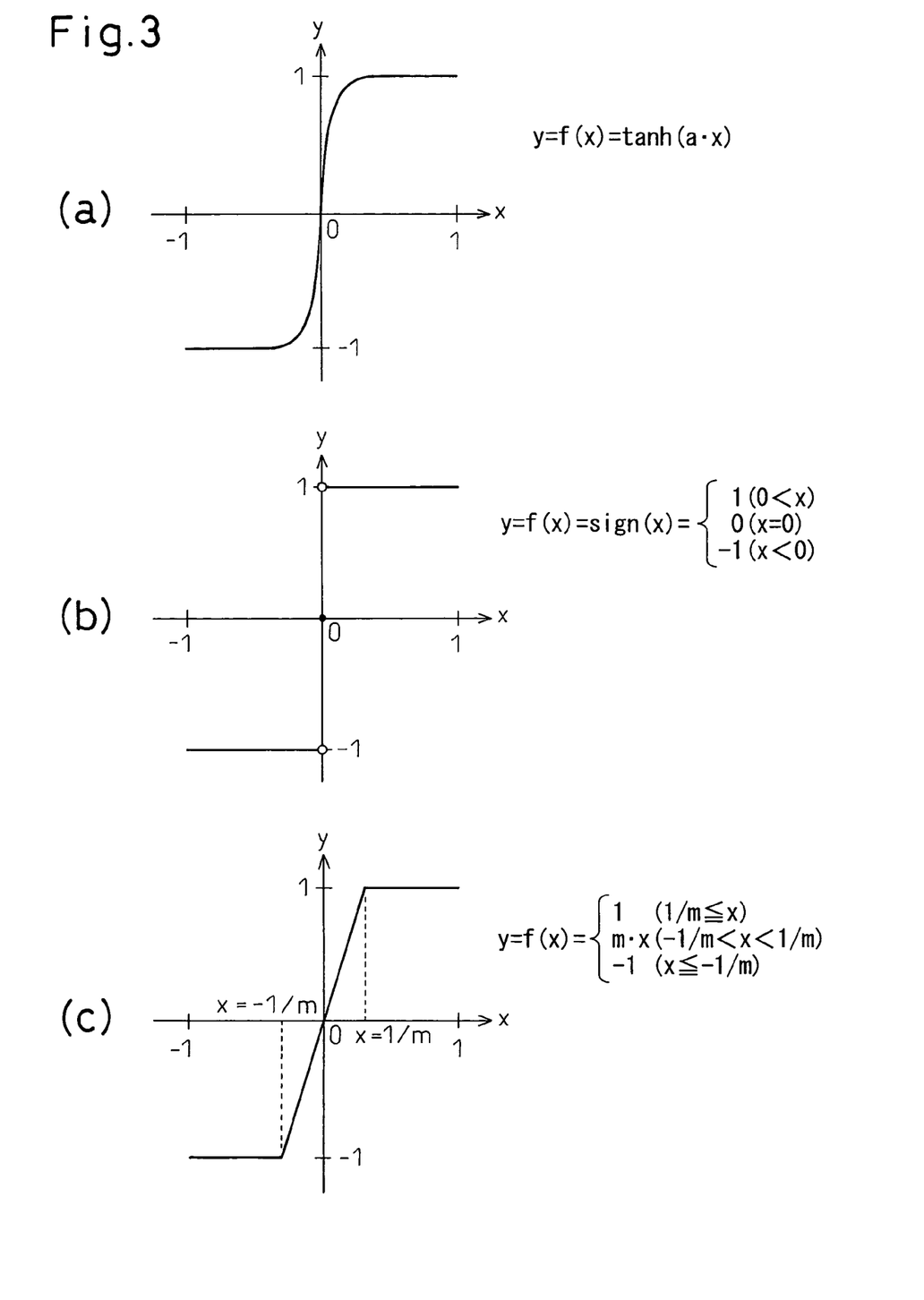
FIG. 3 is a view of nonlinear functions f(x) used in nonlinear converters.

The nonlinear converters 27L and 27R acquire the noise-less speech signal U(t) which the adder 21 outputs, enters this to the nonlinear functions f(x), and output the nonlinearly converted speech signal f(U(t)). Further, FIG. 3 is a view of an example of the nonlinear functions f(x) used in the nonlinear converters 27L and 27R. FIG. 3(a) is a graph showing y=f(x)=tan h(a·x), while FIG. 3(b) is a graph showing y=f(x)=sign(x). Further, sign(x) is a function which takes the value 1 when x is a positive real number, takes the value −1 when x is a negative real number, and takes the value 0 when x is 0. Further, FIG. 3(c) is a graph of y=f(x)=g(x) (see equation (4)).

The filter learning unit 25L acquires the nonlinearly converted speech signal f(U(t)) output from the nonlinear converter 27L and calculates the filter coefficient FL[k] to be set at the adaptive filter 23L next in accordance with equation (8) based on the signal f(U(t)), the digitally converted L channel audio signal $X_L(t)$ input from the A/D converter 13, and the filter coefficient $W_L[k]$ already set in the adaptive filter 23L.

$$F_L[k] = W_L[k] - \alpha_L \cdot f(U(t)) \cdot X_L(t-k) \quad (8)$$

$$\alpha_L = \frac{\alpha}{(norm_L + \beta)} \quad (9)$$

After this, the filter learning unit 25L sets the calculated filter coefficient $F_L[k]$ to the adaptive filter 23L instead of the already set $W_L[k]$ to update the filter coefficient $W_L[k]$.

Similarly, the filter learning unit 25R acquires the nonlinearly converted speech signal $f(U(t))$ output from the nonlinear converter 27R and calculates the filter coefficient $F_R[k]$ to be set at the adaptive filter 23R next in accordance with equation (10) based on the signal $f(U(t))$, the digitally converted R channel audio signal $X_R(t)$ input from the A/D converter 15, and the filter coefficient $W_R[k]$ already set in the adaptive filter 23R.

$$F_R[k] = W_R[k] - \alpha_R \cdot f(U(t)) \cdot X_R(t-k) \quad (10)$$

$$\alpha_R = \frac{\alpha}{(norm_R + \beta)} \quad (11)$$

After this, the filter learning unit 25R sets the calculated filter coefficient $F_R[k]$ to the adaptive filter 23R instead of the already set $W_R[k]$ to update the filter coefficient $W_R[k]$.

Figure 4:
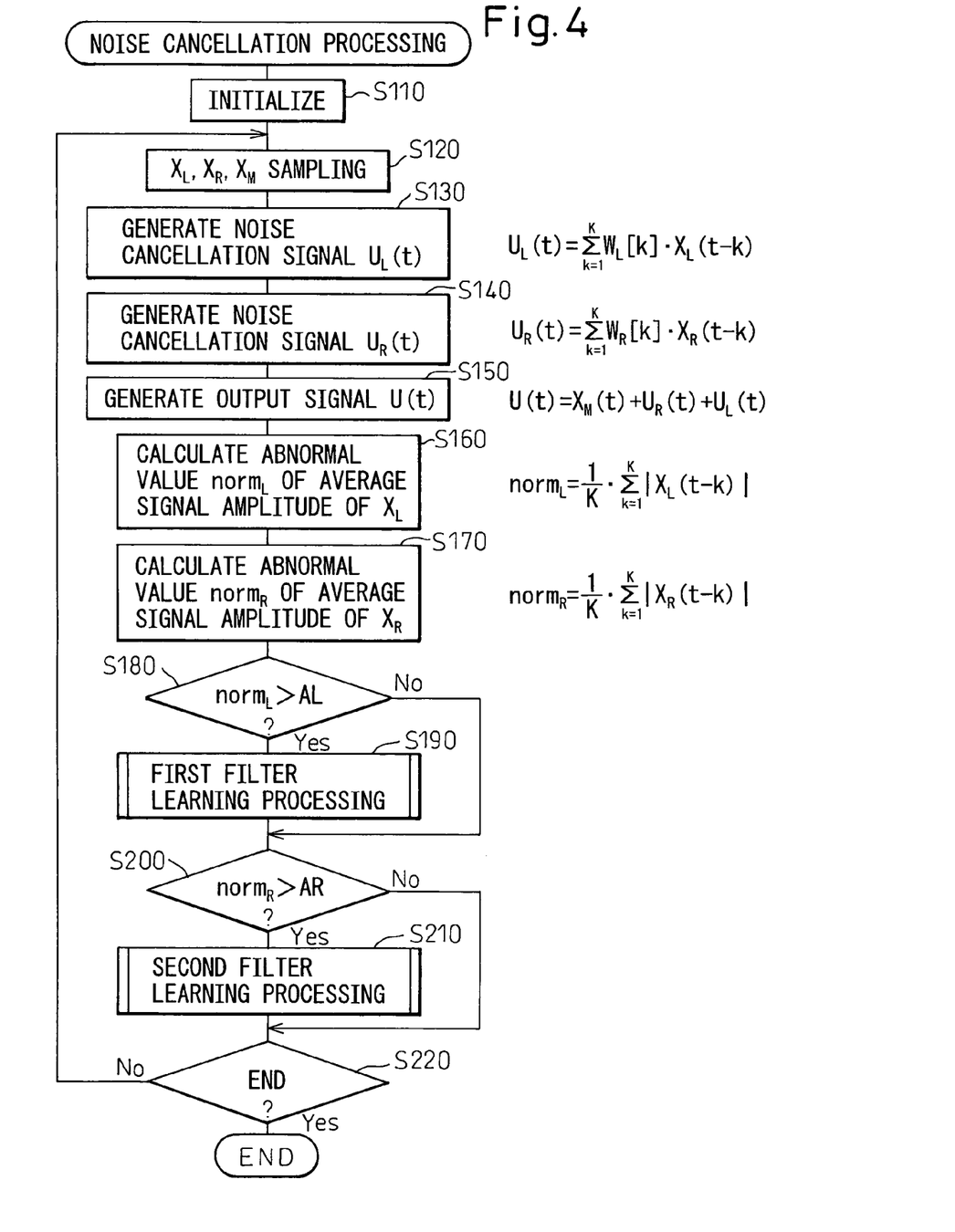
FIG. 4 is a flow chart of noise cancellation processing executed by an audio canceller.

Above, the basic configuration of the audio canceller 20 was explained, but next the flow of the processing which the audio canceller 20 executes will be explained. FIG. 4 is a flow chart of the noise cancellation processing which the audio canceller 20 of the above configuration executes. This noise cancellation processing is executed at the time of start of the car navigation system 1 or at the time of start of the audio system 5.

The audio canceller 20 first performs the initialization and sets the filter coefficients $W_L[k]$ and $W_R[k]$ to the initial values (S110). After this, the audio canceller 20 acquires the speech signal $X_M(t)$ from the A/D converter 11, acquires the L channel audio signal $X_L(5)$ from the A/D converter 13, and acquires the R channel audio signal $X_R(t)$ from the A/D converter 15 (S120). Further, it generates the noise cancellation signal $U_L(t)$ in accordance with equation (5) (S130) and generates the noise cancellation signal $U_R(t)$ in accordance with equation (6) (S140).

After this, the audio canceller 20 adds to the speech signal $X_M(5)$ the noise cancellation signal $U_L(5)$ and the noise cancellation signal $U_R(5)$ to generate the speech signal U(t) (S150). Further, it calculates the average $norm_L$ of the amplitude of the L channel audio signal of the past K·T period (S160) and calculates the average $norm_R$ of the amplitude of the R channel audio signal of the past K·T period (S170).

$$norm_L = \frac{1}{K} \cdot \sum_{k=1}^{K} |X_L(t-k)| \quad (12)$$

$$norm_R = \frac{1}{K} \cdot \sum_{k=1}^{K} |X_R(t-k)| \quad (13)$$

Further, it judges if the average value $norm_L$ of the amplitude of the L channel audio signal calculated is larger than a predetermined threshold value AL. If it judges that $norm_L > AL$ (YES at S180), it executes first filter learning processing (see FIG. 5(a), details explained later) (S190) then proceeds to S200. On the other hand, if it judges that $norm_L \leq AL$ (NO at S180), it proceeds to S200 without executing the first filter learning processing.

At S200, it judges if the average value $norm_R$ of the amplitude of the R channel audio signal calculated is larger than a predetermined threshold value AR. If it judges that $norm_R > AR$ (YES at S200), it executes second filter learning processing (see FIG. 5(b), details explained later) (S210) then proceeds to S220. On the other hand, if it judges that $norm_R \leq AR$ (NO at S200), it proceeds to S220 without executing the second filter learning processing.

At S220, it judges if an end command signal has been input from the controller 40. When judging that the end command signal has been input, it ends the noise cancellation processing, while when judging that the end command signal has not been input, it returns to the processing of S120, acquires the new signals $X_M(t)$, $X_L(t)$, and $X_R(t)$ and executes steps S120 to S220 again.

Figure 5A:
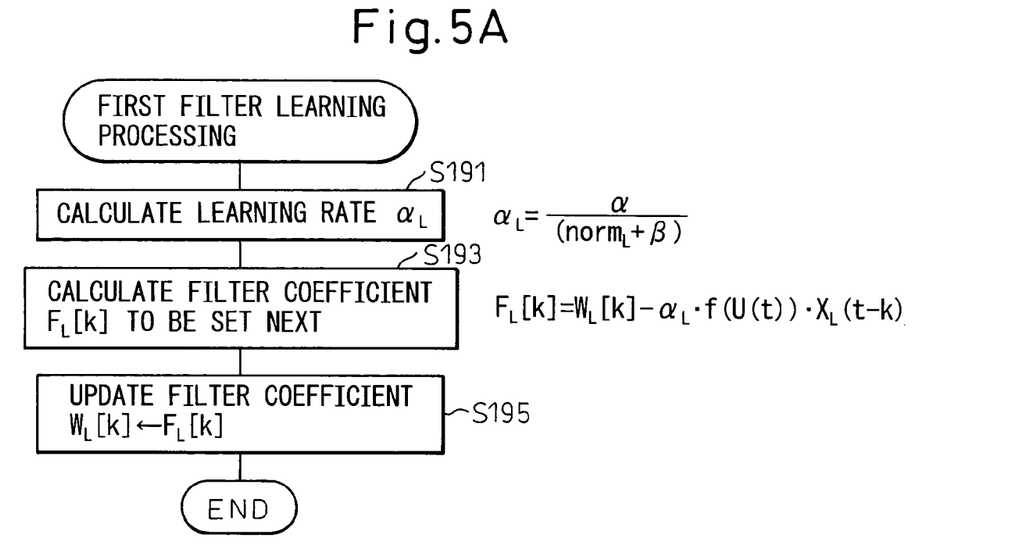
FIG. 5A is a flow chart of first filter learning processing executed by an audio canceller.

FIG. 5(a) is a flow chart of the first filter learning processing executed by the audio canceller 20. In the first filter learning processing, the audio canceller 20 calculates the learning rate $\alpha_L$ in accordance with equation (9) (S191) and calculates the filter coefficient $F_L[k]$ in accordance with equation (8) (S193) After this, it sets the filter coefficient $F_L[k]$ to the filter coefficient $W_L[k]$ used at the next S130 (S195) and ends the first filter learning processing.

Figure 5B:
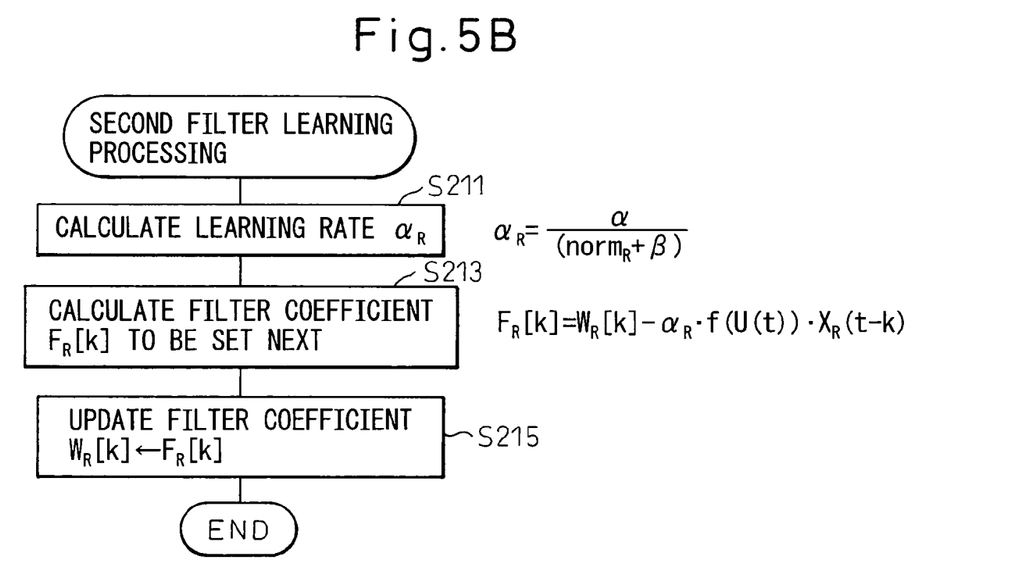
FIG. 5B is a flow chart of second filter learning processing executed by an audio canceller.

Further, FIG. 5(b) is a flow chart of the second filter learning processing executed by the audio canceller 20. If executing the second filter learning processing, the audio canceller 20 calculates the learning rate $\alpha_R$ in accordance with equation (11) (S211) and calculates the filter coefficient $F_R[k]$ in accordance with equation (10) (S213). Further, it sets the filter coefficient $F_R[k]$ to the filter coefficient $W_R[k]$ used at the next S140 (S215) and ends the second filter learning processing.

The speech signal U(t) after noise cancellation produced by the thus configured audio canceller 20 is input to the speech recognition unit 30 through the terminal S0. The speech recognition unit 30 starts operation in accordance with an operation start command signal input from the controller 40, acquires a predetermined period's worth of the speech signal U(t) from the audio canceller 20, analyzes the sound of the predetermined period's worth of the speech signal U(t) acquired, and obtains the characteristic quantity of the speech signal U(t) (for example, cepstrum). Further, the predetermined period for acquisition of the speech signal U(t) is expressed below as the speech recognition interval.

After this, the speech recognition unit 30 uses a known technique to compare the characteristic quantity with the speech patterns registered in a not shown speech dictionary provided by itself, recognizes words corresponding to high match speech patterns as words spoken by the user in the speech recognition interval, and inputs the results of recognition to the controller 40.

Further, the speech recognition unit 30 is provided with a power calculator 31. The power calculator 31 calculates the power of the speech (time average of square of sound pressure) emitted by the user in the speech recognition interval. This power calculator 31 inputs to the controller 40 the power P1(z) of the speech in the speech recognition interval calculated based on the speech signal U(t) with each speech recognition.

FIG. 6 is a flow chart of the speech recognition related processing executed by the controller 40. The controller 40 executes the speech recognition related processing repeatedly until the car navigation system 1 is turned off when the car navigation system 1 is started up.

When executing the speech recognition related processing, the controller 40 waits until a speech recognition start command signal is input from the PTT switch 9. When judging that a speech recognition start command signal is input from the PTT switch 9 (YES at S310), the beep generation command signal is input to the sound generator 50 and a beep is output from the speakers SL and SR (S320). After this, the controller 40 requests the audio system deck 6 to increase the volume of reproduction of the sound (music etc.) to γ-times the current volume and makes the audio system deck 6 change the volume of the sound output from the speakers SR and SL to γ-times the current value (S330).

Further, the controller 40 inputs an operation start command signal to the speech recognition unit 30 to make the speech recognition unit 30 operate (S340). After this, it waits until the speech recognition by the speech recognition unit 30 ends. When judging that the speech recognition ends (YES at S350), it changes the volume of reproduction of the audio system 5 to the original setting (S360). That is, the controller 40 divides by γ the volume increased γ-times upon request at S330 at the audio system 5 to change it to the original volume. After this, the controller 40 executes processing in accordance with speech emitted from the user and input to the microphone 3 based on the recognition results obtained from the speech recognition unit 30 (S370).

Further, the controller 40 acquires the calculated value P1(z) relating to the power of the speech of the user from the speech recognition unit 30 in the current speech recognition interval (S380). Further, it adds the value P1(z) to the history data file stored in the memory 41 (S390). The variable z is a variable indicating the number of speech recognition operations.

After this, the controller 40 judges if at least S times worth of the calculated value P1 has been written in the history data file stored in the memory 41 (S400). When judging that S times worth of the calculated value P1 has not been written (NO at S400), it ends the speech recognition related processing, while when judging that S times worth of the calculated value P1 has been written (YES at S400), it shifts to S410.

Further, it calculates the average value P0(z) of the past S times worth of calculated values P1(z), P1(z−1), P1(z−2), ... P1(z−S+1) (S410) including the current calculated value P1(z) and writes the calculated value P0(z) in the memory 41 (S420).

Further, the controller 40 calculates the γ' based on the calculated value P0(z) written in the memory 41, the preset allowable upper limit $P_{UP}$ of the evaluation standard, and the preset allowable down limit $P_{DOWN}$ of the evaluation standard (S440).

$$\gamma' = h(\gamma, P0(z), P_{UP}, P_{DOWN}) \quad (14)$$

Further, for calculation of γ', a predetermined function h having as variables the above γ, P0(z), $P_{UP}$, and $P_{DOWN}$. Here, the function h takes a value smaller than γ when the value P0(z) is larger than the value $P_{UP}$, takes a value larger than γ when the value P0(z) is smaller than the value $P_{DOWN}$, and takes a value the same as γ when the value P0(z) not less than the value $P_{DOWN}$ and not more than the value $P_{UP}$. Explained more specifically, γ' is calculated in accordance with the following equation. Further, ε is a positive real coefficient suitably set in advance.

$$\gamma' = \begin{cases} \gamma - \varepsilon \cdot \{P0(z) - P_{UP}\} & (P_{UP} < P0(z)) \\ \gamma & (P_{DOWN} \le P0(z) \le P_{UP}) \\ \gamma + \varepsilon \cdot \{P_{DOWN} - P0(z)\} & (P0(z) < P_{DOWN}) \end{cases} \quad (15)$$

After this, the controller 40 sets the calculated value γ' to the variable γ and updates the value of the variable γ (S450). That is, the controller 40 changes the adjustment ratio of the volume at S330 to the value of γ' calculated from the previous value. If ending this step, the controller 40 ends the speech recognition related processing.

Figure 7:
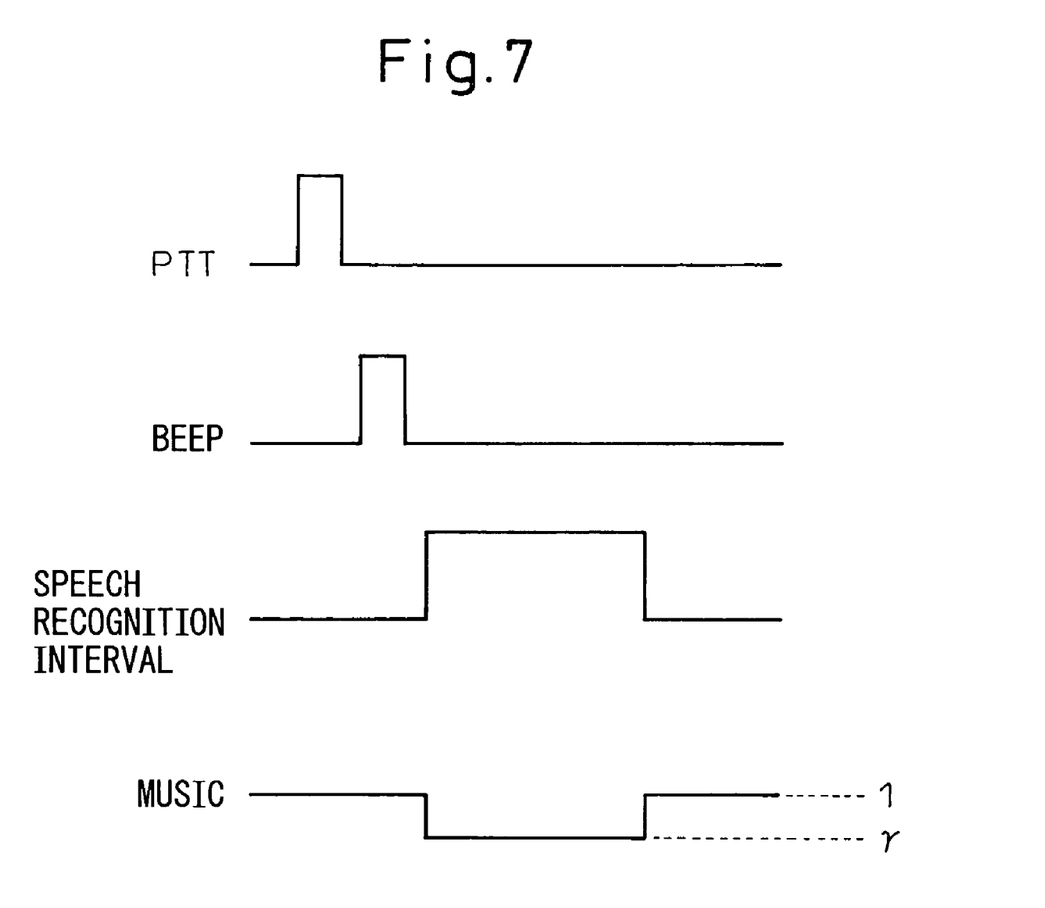
FIG. 7 is a time chart of a mode of operation of a car navigation system.

FIG. 7 is a time chart showing the mode of operation of the car navigation system 1 of the above configuration. The car navigation system 1 outputs a beep from the speakers SL and SR when there is a trigger input as the speech recognition start command signal from the PTT switch 9 and signals the user to indicate that speech recognition starts. After this, it makes the speech recognition unit 30 acquire the speech signal U(t) for the speech of the user of a predetermined period (speed recognition interval) for speech recognition. Further, in the speech recognition interval, it sets the volume of the sound (music etc.) output from the speakers SL and SR to γ-times.

Above, the configuration of the car navigation system 1 was explained, but according to this car navigation system 1, a noise cancellation system comprised of A/D converters 11, 13, and 15 and an audio canceller 20 acquires the audio signals of the different channels (L channel and R channel) and cancels the noise component relating to the reproduced sound of the audio system 5 from the speech signal $X_M(t)$ input from the microphone 3 based on the audio signals of the different channels.

In this audio canceller 20, the nonlinear converters 27L and 27R serving as conversion units nonlinearly convert the noise-less speech signal U(t) output from the adder 21 serving as the noise-less speech signal output unit. Further, the filter learning unit 25L serving as the coefficient updating element calculates the filter coefficient $F_L[k]$ to be set at the adaptive filter 23L serving as the filter element in accordance with equation (8) based on the nonlinearly converted signal f(U(t)) and the L channel audio signal assigned to itself, sets this in the adaptive filter 23L, and updates the filter coefficient $W_L[k]$.

In the same way, the filter learning unit 25R serving as the coefficient updating element calculates the filter coefficient $F_R[k]$ to be set at the adaptive filter 23R serving as the filter element in accordance with equation (10) based on the nonlinearly converted signal f(U(t)) and the R channel audio signal assigned to itself. It sets this at the adaptive filter 23R and updates the filter coefficient $W_R[k]$.

In this way, in the audio canceller 20 of the present embodiment, the filter learning unit 25L (filter learning unit 25R) is affected by the noise component of the R channel (L channel) or the behavior of the filter learning unit 25R (filter learning unit 25L). To suppress mistaken learning of the filter coefficients, the speech signal U(t) output from the adder 21 is nonlinearly converted at the nonlinear converters 27L and 27R, and the nonlinearly converted speech signals f(U(t)) are used to learn and update the filter coefficients at the filter learning units 25L and 25R.

Therefore, according to the audio canceller 20 of the present embodiment, it is possible to cancel the noise component relating to the reproduced sound of the audio system 5 included in the speech signal $X_M(t)$ obtained from a microphone 3 more suitably than a conventional device.

Therefore, in this car navigation system 1, it is possible to accurately recognize the speech of the user input to the microphone 3 by the speech recognition unit 30 and execute the corresponding processing even without interrupting reproduction of music during reproduction at the audio system 5 by muting the audio system 5 at the time of speech recognition.

That is, according to the car navigation system 1, even if music etc. is running from the audio system 5, the speech recognition is accurately executed, the processing corresponding to this can be executed, and the operability of the device is improved. More specifically, it is possible to eliminate displeasure of the user due to interruption of music playback at the time of speech recognition.

Further, if the nonlinear converters 27L and 27R use the tan h function of a nonlinear function for nonlinear conversion, it is possible to cancel noise precisely by simple calculation, the noise cancellation performance of the audio canceller 20 is improved, the processing load of the audio canceller 20 can be suppressed, and an audio canceller 20 can be inexpensively produced.

Further, if the nonlinear converters 27L and 27R use the sign function of a nonlinear function for nonlinear conversion, the noise cancellation performance drops somewhat from the case of use of the tan h function, but the processing load of the audio canceller 20 can be suppressed and the audio canceller 20 can be inexpensively produced.

Further, if the nonlinear converters 27L and 27R use the function g(x) of the nonlinear function shown by equation (4) for nonlinear conversion, a noise cancellation performance of a substantially equal extent as the case of use of the tan h function is obtained, the processing load of the audio canceller 20 can be suppressed, and the audio canceller 20 can be inexpensively produced.

Further, in the car navigation system 1 of the present embodiment, at the time of operation of the audio system 5, when a speech recognition start command signal is input from the PTT switch 9, the controller 40 sets the volume of the sound output from the speakers SL and SR of the audio system 5 (volume of reproduced sound of the audio system 5) to γ-times (S330), then makes the speech recognition unit 30 operate (S340).

The speech recognition unit 30 evaluates the volume of the speech of the user based on the noise-less speech signal U(t) obtained from the audio canceller 20 and inputs the evaluation value P1(z) to the controller 40. The controller 40 writes the evaluation value P1(z) to the history data file and prepares history information relating to the volume of the speech of the user (S390). Further, the controller 40 determines the volume to be set for the audio system 5 at the time of the next speech recognition (that is, the γ-value) based on the value P1(z) of the past S times recorded in the history file (S440, S450).

In this way, in the car navigation system 1 of the present embodiment, the volume of the music etc. reproduced by the audio system 5 is changed before and after speech recognition and the start of speech recognition is informed to the user, so the user can reliably learn of the start of the speech recognition by the change of the volume. Therefore, according to the car navigation device 1 of the present embodiment, the problem of the user finding it harder to obtain a grasp of the timing of the start of speech recognition due to the beep output at the time of start of speech recognition being masked by the music etc. can be eliminated.

In addition, in the present embodiment, the magnitude of the speech of the user is evaluated based on the history data file (S410). The controller 40 is designed so that when the evaluated value P0(z) is higher than an allowable upper limit $P_{UP}$ of the evaluation standard, the γ-value is made smaller than the predetermined standard value (previous γ-value), while when the evaluated value P0(z) is lower than an allowable down limit $P_{DOWN}$ of the evaluation standard, the γ-value is made larger than the predetermined standard value (previous γ-value) (S440, S450).

Therefore, according to the car navigation system of this embodiment, the Lombard effect can be expected and a user with a small speech can be made to speak for speech recognition in a large voice. Accordingly, according to the car navigation system 1 of the present embodiment, it is possible to improve the speech recognition rate by the Lombard effect.

Further, the audio signal acquiring unit of the present invention is realized by the A/D converters 13 and 15 and processing of S120 executed by the audio canceller 20. The control unit is realized by the processing of S310 to S360 executed by the controller 40. Further, the history information preparing unit is realized by the power calculator 31 and the processing of S380 and S390 executed by the controller 40. In addition, the volume determining unit is realized by the processing from S410 to S450.

Further, the noise cancellation system, speech recognition system, and car navigation system of the present invention are not limited to the above embodiments. Various embodiments may be employed. For example, in the above embodiment, as the nonlinear coefficient used in the audio canceller 20, the tan h function, sign function, and function (g) shown in equation (4) were mentioned, but it is also possible to use another nonlinear function.

Further, in the above embodiment, an audio canceller 20 for an audio system 5 playing back sound by a total of two channels of the L channel and R channel was explained, but for example it is also possible to configure the audio canceller 20 to handle a so-called 5.1 channel sound system arranging speakers at the front left, front right, center, rear left, and rear right to generate three-dimensional sound and further arranging a woofer (low sound region speaker) at one location to reinforce the low sound effect.

While the invention has been described with reference to specific embodiments chosen for purpose of illustration, it should be apparent that numerous modifications could be made thereto by those skilled in the art without departing from the basic concept and scope of the invention.

What is claimed is:

1. A noise cancellation system for canceling a noise component relating to reproduced sound of an audio system from a speech signal input from a microphone, provided with:
   a noise cancellation signal generation unit for each channel for generating a noise cancellation signal for removing said noise component based on the audio signal of each channel acquired from an audio system for reproducing multiple channels of sound,
   an output unit for using each noise cancellation signal to remove a noise component included in a speech signal input from said microphone and outputting a noise-less speech signal, and
   a conversion unit for nonlinearly converting said noise-less speech signal,
   each noise cancellation signal generation unit provided with:
   a filter element for filtering said audio signal acquired from said audio system in accordance with a preset filter coefficient so as to generate a noise cancellation signal and
   a coefficient updating element for updating said filter coefficient set in said filter element based on said noise-less speech signal nonlinearly converted by said conversion unit and said audio signal, wherein
   said filter element processes a preset filter coefficient W[k] and an audio signal X(t) by convolutional processing in accordance with the following equation:

$$C(t) = \sum_{k=1}^{K} W[k] \cdot X(t-k)$$

so as to filter said audio signal X(t) and generate said noise cancellation signal C(t), said conversion unit enters a noise-less speech signal U(t) which said noise-less speech signal output unit outputs into a nonlinear function f(x) to generate a converted noise-less speech signal f(U(t)) after said nonlinear conversion, and said coefficient updating element calculates a filter coefficient F[k] based on said converted noise-less speech signal f(U(t)), said audio signal X(t), and said filter coefficient W[k] in accordance with the following equation including preset constants α and β:

$$F[k] = W[k] - \frac{\alpha \cdot f(U(t)) \cdot X(t-k)}{norm + \beta}$$

$$norm = \frac{1}{K} \cdot \sum_{k=1}^{K} |X(t-k)|$$

where, the constant K is a tap number of a whole number of 2 or more, and the variable t is a variable indicating time and a whole value and setting this filter coefficient F[k] in said filter element so as to update said filter coefficient W[k].

2. A noise cancellation system as set forth in claim 1, wherein said conversion unit uses a tanh function of a nonlinear function for said nonlinear conversion.

3. A noise cancellation system as set forth in claim 1, wherein said conversion unit uses a sign function of a nonlinear function for said nonlinear conversion.

4. A noise cancellation system as set forth in claim 1, wherein said conversion unit uses a function g(x) of a nonlinear function:

$$g(x) = \begin{cases} 1 & (1/m \leq x) \\ m \cdot x & (-1/m < x < 1/m) \\ -1 & (x \leq -1/m) \end{cases}$$

where the variable m is a positive real number larger than 1, for said nonlinear conversion.

5. A speech recognition system for recognizing speech based on a noise-less speech signal obtained by canceling a noise component relating to reproduced sound of an audio system from a speech signal input from a microphone, provided with:

a noise cancellation signal generation unit for each channel for generating a noise cancellation signal for removing said noise component based on the audio signal of each channel acquired from an audio system for reproducing multiple channels of sound, an output unit for using each noise cancellation signal to remove a noise component included in a speech signal input from said microphone and outputting a noise-less speech signal, a conversion unit for nonlinearly converting said noise-less speech signal, and a speech recognition unit for recognizing speech input to said microphone based on said noise-less speech signal, each noise cancellation signal generation unit provided with:

a filter element for filtering said audio signal acquired from said audio system in accordance with a preset filter coefficient so as to generate a noise cancellation signal and a coefficient updating element for updating said filter coefficient set in said filter element based on said noise-less speech signal nonlinearly converted by said conversion unit and said audio signal, wherein said filter element processes a preset filter coefficient W[k] and an audio signal X(t) by convolutional processing in accordance with the following equation:

$$C(t) = \sum_{k=1}^{K} W[k] \cdot X(t-k)$$

so as to filter said audio signal X(t) and generate said noise cancellation signal C(t), said conversion unit enters a noise-less speech signal U(t) which said noise-less speech signal output unit outputs into a nonlinear function f(x) to generate a converted noise-less speech signal f(U(t)) after said nonlinear conversion, and said coefficient updating element calculates a filter coefficient F[k] based on said converted noise-less speech signal f(U(t)), said audio signal X(t), and said filter coefficient W[k] in accordance with the following equation including preset constants α and β:

$$F[k] = W[k] - \frac{\alpha \cdot f(U(t)) \cdot X(t-k)}{norm + \beta}$$

$$norm = \frac{1}{K} \cdot \sum_{k=1}^{K} |X(t-k)|$$

where, the constant K is a tap number of a whole number of 2 or more, and the variable t is a variable indicating time and a whole value and setting this filter coefficient F[k] in said filter element so as to update said filter coefficient W[k].

6. A speech recognition system provided with:

a noise cancellation unit for acquiring audio signals of channels from an audio system reproducing channels of sound and canceling a noise component relating to reproduced sound of said audio system from a speech signal input from a microphone based on said audio signals of the channels, a speech recognition unit for recognizing speech input to said microphone based on a noise-less speech signal obtained from said noise cancellation unit, a control unit for making said speech signal recognition unit operate when a speech recognition start command is input from the outside, a history preparing unit for preparing history information of volumes of actual speech of a user while in a vehicle based on said noise-less speech signal obtained from said noise cancellation unit, the actual speech of the user having been made more than predetermined times at the time of operation of said speech recognition unit, and a volume determining unit for determining a volume to be set in said audio system at the time of next speech recognition based on said history information prepared by said history preparing unit, wherein said control unit changing the volume of sound reproduced by said audio system to a volume determined by said volume determining unit and then making said speech recognition unit operate when a speech recognition start command is input from the outside and wherein said volume determining unit evaluates a magnitude of the actual speech of the user based on said history information and determines a different volume to be set in said audio system at the time of next speech recognition to a volume larger than a predetermined reference value when that evaluated value is smaller than a predetermined evaluation standard.

7. A car navigation system operated based on a noise-less speech signal obtained by canceling a noise component relating to reproduced sound of an audio system from a speech signal input from a microphone, provided with:
- a noise cancellation signal generation unit for each channel for generating a noise cancellation signal for removing said noise component based on the audio signal of each channel acquired from an audio system for reproducing multiple channels of sound,
- an output unit for using each noise cancellation signal to remove a noise component included in a speech signal input from said microphone and outputting a noise-less speech signal,
- a conversion unit for nonlinearly converting said noise-less speech signal, and
- a speech recognition unit for recognizing speech input to said microphone based on said noise-less speech signal,
- each noise cancellation signal generation unit provided with:
- a filter element for filtering said audio signal acquired from said audio system in accordance with a preset filter coefficient so as to generate a noise cancellation signal and
- a coefficient updating element for updating said filter coefficient set in said filter element based on said noise-less speech signal nonlinearly converted by said conversion unit and said audio signal, wherein said filter element processes a preset filter coefficient W[k] and an audio signal X(t) by convolutional processing in accordance with the following equation:

$$C(t) = \sum_{k=1}^{K} W[k] \cdot X(t-k)$$

so as to filter said audio signal X(t) and generate said noise cancellation signal C(t),
said conversion unit enters a noise-less speech signal U(t) which said noise-less speech signal output unit outputs into a nonlinear function f(x) to generate a converted noise-less speech signal f(U(t)) after said nonlinear conversion, and
said coefficient updating element calculates a filter coefficient F[k] based on said converted noise-less speech signal f(U(t)), said audio signal X(t), and said filter coefficient W[k] in accordance with the following equation including preset constants α and β:

$$F[k] = W[k] - \frac{\alpha \cdot f(U(t)) \cdot X(t-k)}{norm + \beta}$$

$$norm = \frac{1}{K} \cdot \sum_{k=1}^{K} |X(t-k)|$$

where, the constant K is a tap number of a whole number of 2 or more, and the variable t is a variable indicating time and a whole value and
setting this filter coefficient F[k] in said filter element so as to update said filter coefficient W[k].

8. A car navigation system executing an operation recognized by a speech recognition unit provided with:
- a noise cancellation unit for acquiring audio signals of channels from an audio system reproducing multiple channels of sound and canceling a noise component relating to the reproduced sound of said audio system from audio signals input from a microphone based on the audio signals of the channels,
- a speech recognition unit for recognizing speech input to said microphone based on the noise-less speech signal obtained from said noise cancellation unit, and
- a control unit for operating said speech recognition unit when a speech recognition start command is input from the outside,
- a history preparing unit for preparing history information of volumes of actual speech of a user while in a vehicle based on said noise-less speech signal obtained from said noise cancellation unit, the actual speech of the user having been made more than predetermined times at the time of operation of said speech recognition unit, and
- a volume determining unit for determining a volume to be set in said audio system at the time of next speech recognition based on said history information prepared by said history preparing unit, wherein said control unit changing the volume of sound reproduced by said audio system to a volume determined by said volume determining unit and then making said speech recognition unit operate when a speech recognition start command is input from the outside, and said volume determining unit evaluates a magnitude of the actual speech of the user based on said history information and determines a different volume to be set in said audio system at the time of next speech recognition to a volume larger than a predetermined reference value when that evaluated value is smaller than a predetermined evaluation standard.

* * * * *